United States Patent
Bertnik et al.

(10) Patent No.: US 6,669,441 B2
(45) Date of Patent: Dec. 30, 2003

(54) EXHAUST-GAS TURBINE

(75) Inventors: Karl-Heinz Bertnik, Bopfingen (DE); Volker Döring, Stuttgart (DE); Hans-Dieter Hensel, Vaihingen (DE); Peter Schick, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/878,027

(22) Filed: Jun. 8, 2001

(65) Prior Publication Data
US 2003/0123977 A1 Jul. 3, 2003

(30) Foreign Application Priority Data
Jun. 9, 2000 (DE) .......................... 100 28 732

(51) Int. Cl.⁷ .............................................. F01D 17/16
(52) U.S. Cl. ........................................ 415/158; 415/200
(58) Field of Search ................... 415/157, 158, 415/167, 191, 200

(56) References Cited

U.S. PATENT DOCUMENTS

| | | | |
|---|---|---|---|
| 4,711,677 A | * 12/1987 | Mendelson | 148/325 |
| 5,106,578 A | * 4/1992 | Ohtsuka et al. | 420/68 |
| 5,855,117 A | * 1/1999 | Sumser et al. | 60/602 |
| 5,910,000 A | * 6/1999 | Schade et al. | 415/158 |

FOREIGN PATENT DOCUMENTS

DE 196 45 388 5/1998

* cited by examiner

Primary Examiner—Ninh H. Nguyen
(74) Attorney, Agent, or Firm—Kenyon & Kenyon

(57) ABSTRACT

An exhaust-gas turbine for a turbocharger includes a rotor mounted rotatably in a turbine casing having a spiral inlet duct which is followed by an annular space surrounding the rotor. A guide-blade cascade is capable of being pushed axially into the annular space near the outer circumference of the rotor. The guide-blade cascade includes guide blades, is guided in an annular gap between an inner part and the turbine casing and is axially displaceable via an axial slide by a sliding sleeve. The guide-blade cascade with the axial slide, the inner part and/or the sliding sleeve are produced from an austenitic cast steel material having the following components:

$C \leq 0.2\%$;
Si $1.5–2.5\%$;
$Mn \leq 2.00\%$;
$P \leq 0.045\%$;
$S \leq 0.03\%$;
Cr $24.0–26.0\%$;
Ni $19–22\%$; and
$W \leq 5\%$.

3 Claims, 1 Drawing Sheet

EXHAUST-GAS TURBINE

FIELD OF THE INVENTION

The invention relates to an exhaust-gas turbine.

BACKGROUND INFORMATION

German Published Patent Application No. 196 45 388 describes an exhaust-gas turbine, in which a guide-blade cascade can be engaged axially into an annular space between a spiral inlet duct and a rotor. The guide-blade cascade has, on its free end face, a cover disc which, when the guide-blade cascade is in a pushed-back position, covers an annular gap between the turbine casing and an inner part for guiding the guide-blade cascade. The guide-blade cascade and the inner part are exposed to the high temperatures of the exhaust gases. They also experience pronounced temperature fluctuations in the different operating regions, thus leading to thermal stresses and different thermal expansions. The latter may cause distortions of the components, as a result of which, on the one hand, the geometric designs may change and, on the other hand, frictional losses may occur in guides on the moved components. Moreover, the actuating device and the guide-blade cascade may be jammed in the guides. Furthermore, the components are exposed to the corrosive influence of the aggressive exhaust gases.

SUMMARY

It is an object of the present invention to provide an exhaust-gas turbine in which the guide-blade cascade with the axial slide, the inner part with its guide an/or a sliding sleeve is formed of a material that can withstand the operating conditions and which is easily machinable.

The above and other beneficial objects of the present invention are achieved by providing an exhaust-gas turbine as described herein. According to one embodiment of the present invention, the guide-blade cascade with the axial slide, the inner part and/or the sliding sleeve are produced from an austenitic cast steel material having the following components:

C<0.2%;
Si 1.5–2.5%;
Mn≦2.00%;
P≦0.045%;
S≦0.03%;
Cr 24.0–26.0%;
Ni 19–22%; and
W≦5%.

This material provides high wear resistance, thermal resistance and corrosion resistance and is therefore suitable for use in a harsh environment. It is weldable and may be machined mechanically in a simple manner, with the result that the components are easy to produce. Due to the low coefficient of thermal expansion of the material, the components change their shape only slightly under the effect of the heat of the exhaust gases. The risk that a moved component will be jammed in its guide is therefore extremely low.

According to the present invention, the fraction of tungsten may be below 5%, such as, for example, between 1.4% and 1.8% or approximately 2%. In addition to tungsten, niobium, tantalum and/or molybdenum may be alloyed approximately in the same order of magnitude, and care should be taken to ensure that the formation of δ-ferrite is avoided.

Components made of the material according to the present invention are distinguished by fault-free long-term use under high temperatures and temperature fluctuations.

DETAILED DESCRIPTION

Provided in a turbine casing 1 is a double-flow spiral inlet duct 13 which opens into an annular space 8. This is followed inwardly in the radial direction by a rotor, not illustrated in any more detail, of the exhaust-gas turbine, the exhaust gases flowing through the rotor into an axially directed outlet duct 14.

Figure 1:
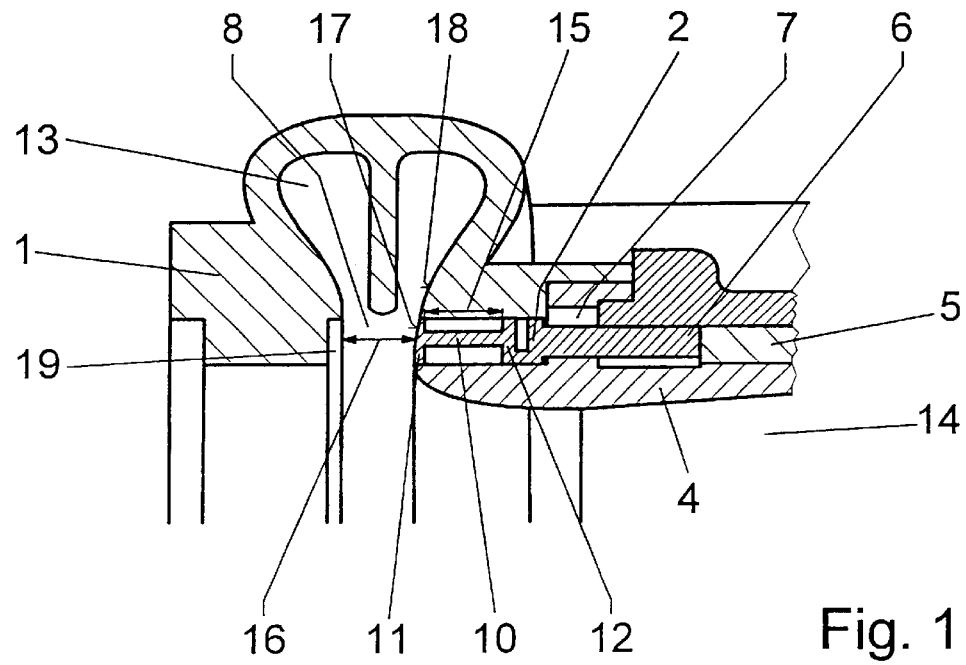
FIG. 1 is a partial longitudinal cross-sectional view through a turbine casing of an exhaust-gas turbine without the rotor, with a disengaged guide-blade cascade.
Figure 2:
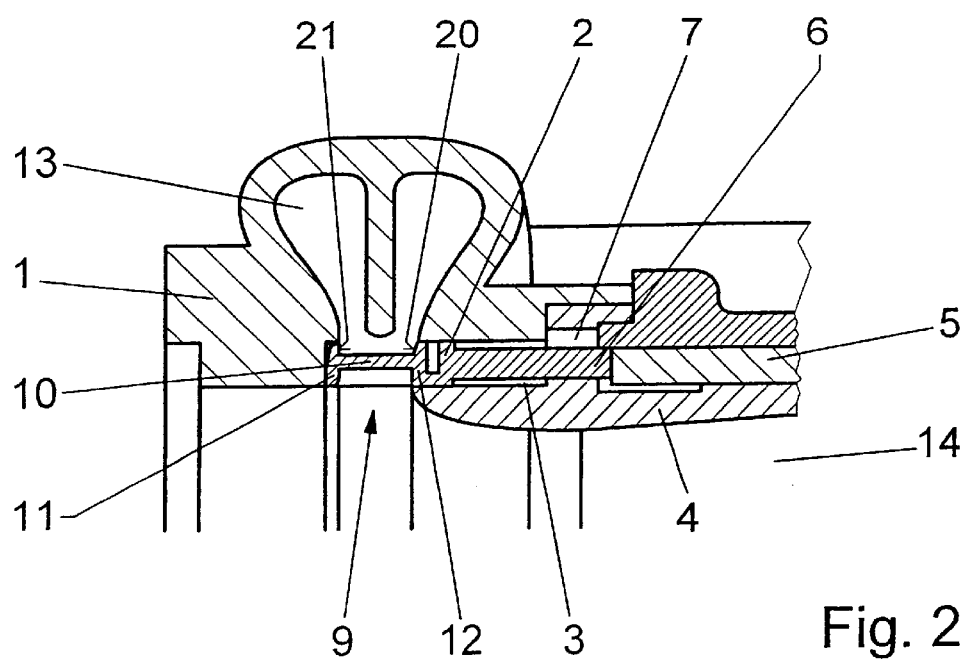
FIG. 2 is a longitudinal cross-sectional view through a turbine casing of an exhaust-gas turbine having an engaged guide-blade cascade.

Provided in an annular gap 3 between the turbine casing 1 and an inner part 4 is an annular axial slide 2 which carries a guide-blade cascade 9 with guide blades 10. The end faces of the guide blades 10 are connected to one another by cover discs 11 and 12. A bladed region 15 of the guide-blade cascade 9 corresponds to the axial extent 16 of the annular space 8. At that end of the axial slide 2 which faces away from the guide-blade cascade 9 are located sliding pins 6, by which the axial slide 2 is guided axially displaceably in the circumferential direction in a slot 7 of the inner part 4. A sliding sleeve 5 acts on the sliding pins 6 on their end face and engages the axial slide 2 together with the guide-blade cascade 9 into the annular space 8 (FIG. 2) or disengages it from the annular space 8 (FIG. 1). When the axial slide 2 is in the engaged state, the cover disc 11 enters a recess 19 of the turbine casing 1 and is covered axially by the recess on the onflow side, so that the cover disc 11 does not disturb the flow through the annular space 8 and the exhaust gases are deflected solely by the guide blades 10 which completely cover the axial extent 16 of the annular space 8. The edges 20 and 21 of the cover discs 11 and 12 which face the guide blades 10 on the onflow side may be rounded and/or terminate flush with the contour 18 of the inlet duct 13 (FIG. 2). When the axial slide 2 is in the disengaged state (FIG. 1), the cover disc 11 enters the annular gap 3 to an extent such that its contour 17 facing the guide blades 10 terminates flush with the contour 18 of the inlet duct 13. The guide-blade cascade 9 with the axial slide 2, the inner part 4 and/or the sliding sleeve 5 are manufactured from the material according to the present invention, so that they a long fail-safe service life is achieved despite the high aggressive and thermal load caused by the exhaust gases.

What is claimed is:

1. An exhaust-gas turbine for a turbocharger, comprising:

a turbine casing having a spiral inlet duct;

a rotor rotatably mounted in the turbine casing, an annular space of the turbine casing surrounding the rotor;

an axial slide;

a sliding sleeve; and a guide-blade cascade including guide blades, the guide-blade cascade being axially movable into the annular space near an outer circumference of the rotor, the guide-blade cascade being guided in an annular gap formed between an inner part and the turbine casing and being axially displaceable via the axial slide by the sliding sleeve;

wherein the guide-blade cascade and at least one of the axial slide, the inner part and the sliding sleeve are formed from an austenitic cast steel material having the following components:

$C \leqq 0.2\%$;

Si 1.5–2.5%;

$Mn \leqq 2.00\%$;

$P \leqq 0.045\%$;

$S \leqq 0.03\%$;

Cr 24.0–26.0%;

Ni 19–22%; and $W \leqq 5\%$.

2. The exhaust-gas turbine according to claim 1, wherein the material includes approximately 2% W.

3. The exhaust-gas turbine according to claim 1, wherein the material includes at least one of niobium, tantalum and molybdenum and substantially lacks δ-ferrite.

* * * * *

UNITED STATES PATENT AND TRADEMARK OFFICE
CERTIFICATE OF CORRECTION

PATENT NO.    : 6,669,441 B2
DATED         : December 30, 2003
INVENTOR(S)   : Bertnik et al.

It is certified that error appears in the above-identified patent and that said Letters Patent is hereby corrected as shown below:

<u>Column 1,</u>
Line 35, change "an/or" to -- and/or --;
Line 45, change "C<0.2%;" to -- C $\leq$0.2%; --; and <u>Column 2,</u>
Line 65, change "that they a long" to -- that a long --.

Signed and Sealed this

Twenty-third Day of May, 2006

JON W. DUDAS
*Director of the United States Patent and Trademark Office*